Inventors
Nicholas Demos
Harvey B. Dawson

United States Patent Office 2,797,122
Patented June 25, 1957

2,797,122

VEHICLE TRANSPORTER WITH SELECTIVELY POSITIONABLE POSTS FOR SUPPORTING TRACK MEMBERS

Nicholas Demos, Kenosha, Wis., and Harvey B. Dawson, El Monte, Calif.; said Dawson assignor to said Demos Application December 6, 1954, Serial No. 473,268

12 Claims. (Cl. 296—1)

This invention relates to automobile transport devices and has more particular reference to improvements in trailers like those shown and described in Patents No. 2,684,264, and No. 2,695,810 issued to Nicholas Demos on July 20, 1954, and November 30, 1954, respectively.

The above identified patents relate to what has now become known as a "flat top" trailer by reason of the fact that its superstructure means can be readily knocked-down and the trailer converted to a freight hauling device having an unobstructed freight supporting deck at a low level only slightly above that of the tops of the trailer wheels.

Of the many advantages of this construction, one of the most important is the substantial reduction in weight made possible by the fact that the trailer sides extend upwardly no higher than substantially the level of the tops of the trailer wheels, while its knock-down super-structure comprises easily handled hollow posts which can be readily removably stepped into sockets located at several locations along the chassis sides. The wheel supporting members carried by the upper ends of the posts are also readily detachable, so that the entire superstructure can be quickly erected and dismounted with a minimum of manual labor.

An even more important feature of the so called "flat top" trailer described is its versatility. It can be very easily adapted for the hauling of most any kind of automotive vehicles, including trucks of various types, as well as either four or five full size automobiles. This is made possible to a large extent by the fact that an operator of the transport device can erect the superstructure posts at different locations along the chassis sides to accommodate the vehicles loaded on the trailer in the most advantageous positions.

From the above, it will be apparent that it is necessary, in an all purpose trailer of the type here under consideration, to be able to support the upright posts of the dismountable superstructure at any of the many different locations along the length of the chassis sides. However, since it is obviously desirable to hold the weight of the trailer to a minimum value, large numbers of elongated upright tubular socket members, such as are provided in the trailer of the aforesaid patents, cannot be fixed to the chassis sides to enable the superstructure posts to be erected anywhere desired along the length of the trailer. While it may be desirable to employ a few socket members of that type for their reinforcing value, the weight of the trailer would soon become excessive if the number of such socket members necessary to accommodate any desired location of the posts were provided.

It is the object of this invention, therefore, to provide a trailer of the so-called "flat top" type with novel means on each of the low upright walls of the trailer to support the posts of the superstructure substantially anywhere desired along the length of the trailer, without objectionably adding to its weight.

It is a further object of this invention to provide a so-called "flat top" automobile transporting trailer of the character described wherein the means for supporting the superstructure posts comprises elongated upper and lower rails fixed to the inner side of each chassis side wall, said rails having the additional functions of reinforcing the chassis side walls and of providing ledges thereon capable of supporting a wooden platform or freight deck on the chassis either at an upper level adjacent to that of the tops of the trailer wheels or at a lower level, spaced above the bottom of the chassis, when the trailer is not being used for the transportation of automotive vehicles.

With the above and other objects in view, which will appear as the description proceeds this invention resides in the novel construction combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
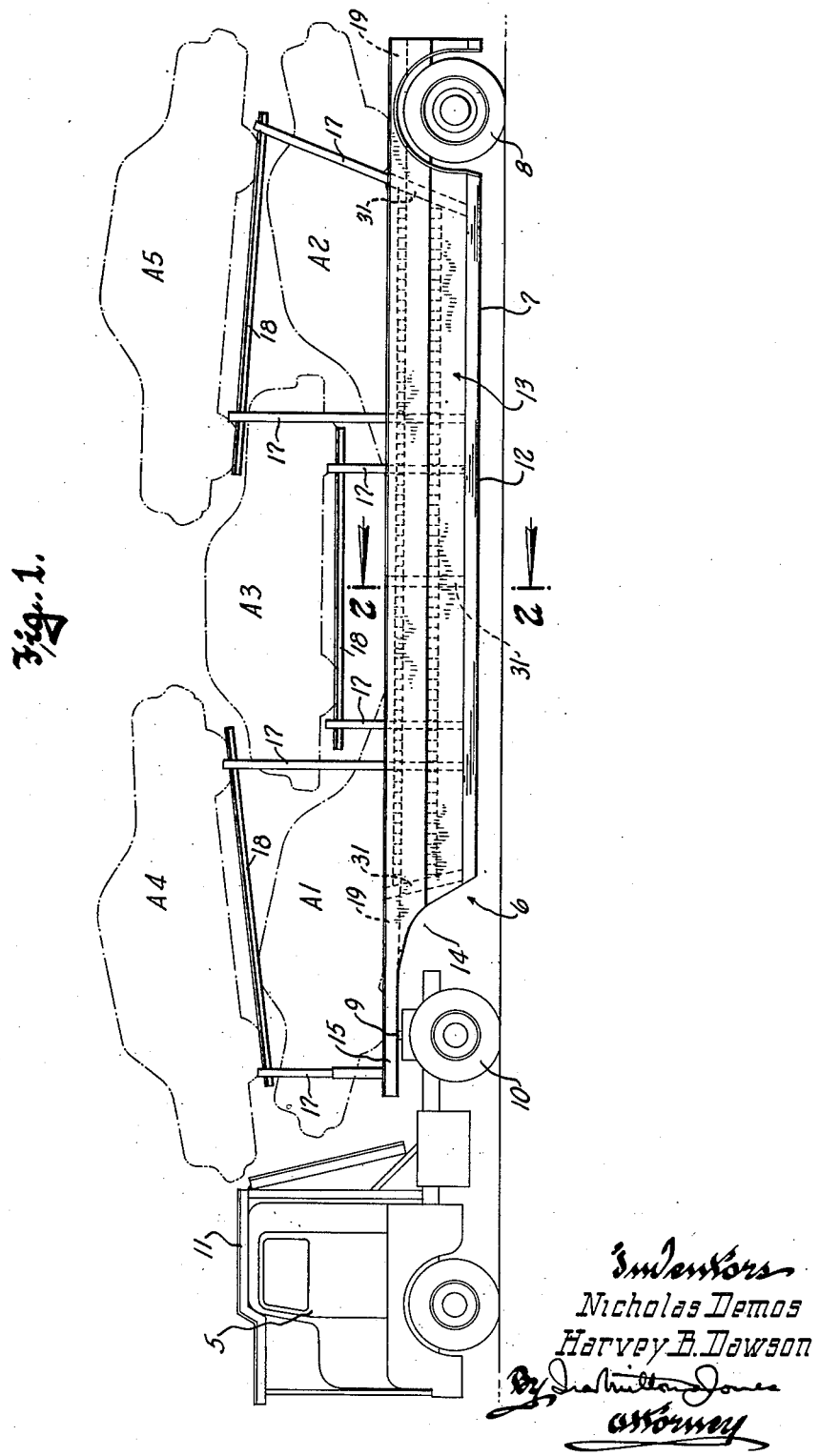
Figure 1 is a side elevational view of the automobile transporting semi-trailer of this invention, showing its front end supported on a tractor for transit.

Referring now more particularly to the accompanying drawings, it will be seen that the transport device of this invention is, in many respects, similar to that shown and described in Patent No. 2,695,810 issued to Nicholas Demos on November 30, 1954. It comprises a truck or tractor 5 of a conventional short wheel base type, and an elongated semi-trailer 6 having a length slightly greater than twice that of a full size automobile. The trailer is approximately 35 feet long, and the combined length of the tractor and trailer does not exceed 45 feet.

The chassis 7 of the semi-trailer is supported by wheels 8 at its rear and its front end has a fifth wheel draft connection 9 with the rear of the tractor. The fifth wheel connection, of course, provides a pivotal support for the front end of the trailer directly over the rear wheels 10 of the tractor.

The primary purpose of the transport unit of this invention is to transport five full size automobiles with either four of the automobiles carried by the trailer and one supported on tracks 11 over the cab of the tractor, in the manner disclosed in Patent No. 2,684,264, issued to Nicholas Demos on July 20, 1954, or with all five automobiles carried by the trailer substantially in the manner disclosed in Patent No. 2,695,810 issued to Nicholas Demos on November 30, 1954. In both cases, the height of the loaded unit may not exceed 13½ feet.

As in the aforesaid patents, the trailer chassis has a low bottom portion 12 which may be in the nature of a floor extending substantially horizontally from a point just ahead of the rear wheels 8 to a point a short distance rearwardly of the front end of the trailer and a distance behind the rear wheels 10 of the tractor, the floor being disposed at a level slightly below that of the wheel axes. The chassis is further provided with low upright longitudinal side walls, generally designated 13, rigidly joined to the bottom portion of the chassis and extending upwardly therefrom only a slight distance above the level of the tops of the wheels so that the trailer may be said to have no permanent portion thereof extending upwardly above a level closely adjacent to that of the tops of the trailer wheels.

As is customary in trailers of the type here under consideration, the bottom of the front end portion of the chassis is recessed as at 14 to provide turning clearance, and to define a substantially horizontal apron 15 which overlies the rear wheels of the tractor and is joined thereto by the fifth wheel connection 9.

As shown in construction lines in Figure 1, two automobiles A1 and A2 are adapted to be loaded onto the trailer at a low level thereon with at least their adjacent end portions supported upon the bottom 12 of the chassis, while three other automobiles A3, A4 and A5 are adapted to be carried by the trailer at higher levels. As in the aforesaid patents to Nicholas Demos, detachable superstructure means comprising posts 17 having load bearing elements such as track members 18 detachably connected with their upper end portions to be supported thereby, are provided to support the upper level automobiles, and this invention provides improved means for dismountably supporting the superstructure posts 17 in upright positions almost anywhere along the length of the chassis side walls, which are of special construction for this purpose.

Each of the chassis side walls comprises a pair of elongated upper and lower beams 19 and 20 extending substantially horizontally along the upper and lower edges, respectively, of the side wall, with the tops of the upper beams disposed at a level adjacent to that of the tops of the trailer wheels and substantially defining the upper edge of the side wall. While the upper beams 19 extend substantially continuously from one end to the other of the chassis, the lower beams 20 are shorter since they extend only from the recessed portion 14 at the front of the trailer to a point just short of the trailer wheels 8, at a level slightly below that of the wheel axes. As shown, the upper beams 19 comprise channels having their backs facing one another and disposed in vertical planes. The lower beams 20 are offset inwardly with respect to the upper beams, and each comprises an angle iron having an upstanding leg 22 and a horizontal leg 23 which extends outwardly to the plane of the back of the beam 19 thereabove. Cross beams 24 extending transversely across the bottom of the chassis have their ends abutting and welded or otherwise secured to the upstanding legs 22 of the lower beams, and it will be understood that the cross beams are connected between the lower beams at several locations along the length of the chassis to provide the necessary strength and rigidity for the bottom thereof.

The exterior of each side wall 13 of the chassis is covered with substantially light gauge sheet metal panelling bent to provide vertical upper and lower sections 26 and 27, respectively, of substantially equal height. The upper section 26 is secured over the outer side of the adjacent upper beam and the lower section is offset inwardly therefrom so as to lie in the plane of the back of the upper beam. A narrow horizontal offset 28 substantially midway between the upper and lower edges of the side wall and integral with the panel sections joins their adjacent edges.

The side wall panelling continues diagonally downwardly and inwardly from the lower panel sections 27, integrally therewith, across the extremities of the legs of the lower beams 20 to be directed horizontally inwardly as at 29 to provide part of the bottom wall structure 12.

According to this invention, each of the chassis sides comprises an exceptionally rigid framework built up from substantially light weight structural members. In addition to the elongated upper and lower beams 19 and 20, this framework comprises a plurality of tubular upright members 31 joining said beams at spaced locations along the length of each side wall, and a pair of elongated upper and lower rails 32 and 33, respectively, extending endwise between the adjacent upright members 31 with their ends abutting the same and welded or otherwise rigidly secured thereto.

As best seen in Figure 1, one of the tubular upright members 31 is preferably located near each end portion of a side wall, and one or more of said upright members may be positioned at locations intermediate the ends of said side wall. The lower ends of the tubular upright members seat on the horizontal flange 23 of the lower beam 20 of each side wall and are welded thereto, while the upper end portions of the tubular members lie against the backs of the channels which provide the upper beam of the side wall and are likewise welded or otherwise rigidly secured thereto. Each of these upright tubular members, of course, is of a size and shape to endwise slidably receive and dismountably support one of the posts 17 of the superstructure.

It is a highly important feature of this invention that the upper and lower rails 32 and 33, respectively, form a part of the rigid framework comprising each side wall. These rails not only greatly reinforce the side walls and give them the necessary strength and rigidity, but also incorporate novel means for supporting the superstructure posts at almost any desired position along the length of the trailer. As will become apparent from the following more detailed description of the rails, this feature is of great importance in an all purpose trailer of the type herein concerned, since it imposes practically no restriction upon placement of the superstructure wherever it is needed for the support of various types and sizes of automotive vehicles.

The upper rail 32 of each side wall extends substantially horizontally along the back of the upper beam 19 on said side wall and is welded thereto, and it will be noted that the upper rail extends substantially continuously from one end of the side wall to the other, being interrupted only at those locations where the upper ends of the tubular upright members 31 attach to the upper beam 19. The lower rail 33 on each side wall extends substantially horizontally along the upper end portion of the lower panel section 27 on said side wall and is welded thereto. The lower rails 33, therefore, are located at a level substantially midway between the upper and lower edges of the side walls and extend substantially continuously therealong, being interrupted only at those locations at which the tubular upright members 31 are connected between the upper and lower beams of the side walls.

Each of the rails is in the nature of an elongated hollow beam and comprises a pair of elongated substantially narrow plates 34 held in spaced apart vertical planes by a series of upright equispaced partitions or dividers 35 extending edgewise between the plates and welded thereto. The spacing of the dividers 35 and between the plates 34 is such that each pair of adjacent dividers cooperates with the plates to define a tubular socket section of the same shape and cross sectional dimensions as those of the upright tubular members 31.

It is to be understood, of course, that the rails are secured to the chassis sides with each of the tubular socket sections in an upper rail aligning with a socket section in the rail therebeneath and cooperating therewith to provide a holder in which a superstructure post may be stepped. Hence, except for the tubular members 31, each socket or holder may be said to comprise upper and lower tubular socket sections adapted to embrace a superstructure post at areas thereof which are spaced apart a substantial distance along the lower end portion of the post, to thereby support the post with sufficient rigidity to resist all normal side thrusts that may be imposed thereon.

If desired, the rails with their built-in tubular socket sections may extend continuously along the chassis sides, in which case each of the upright members 31 would comprise a pair of short upper and lower aligning tubular sections, the upper section extending between the rails, and the lower section extending between the lower rail 33 and the beam 20 therebeneath.

Figure 2:
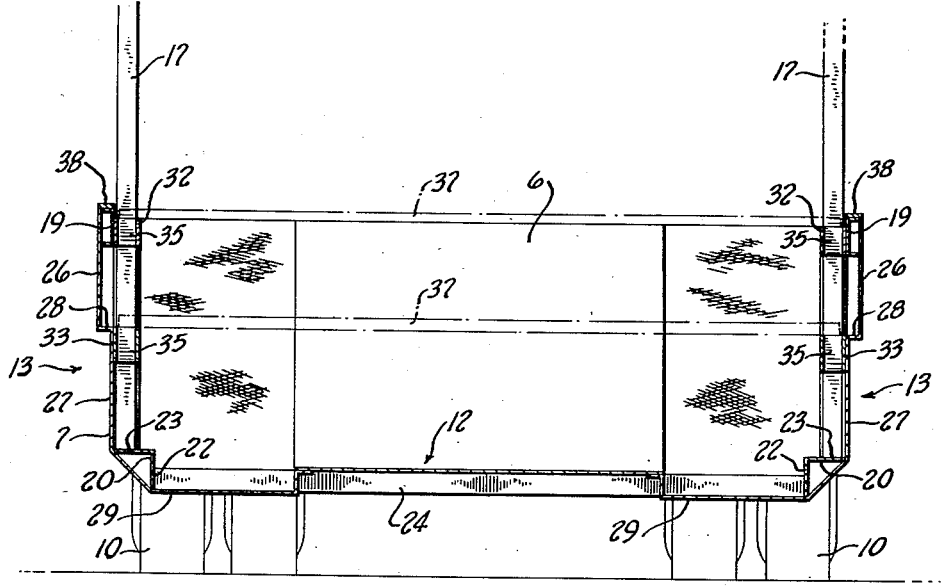
Figure 2 is an enlarged cross-sectional view taken through Figure 1 along the plane of the line 2—2.
Figure 3:
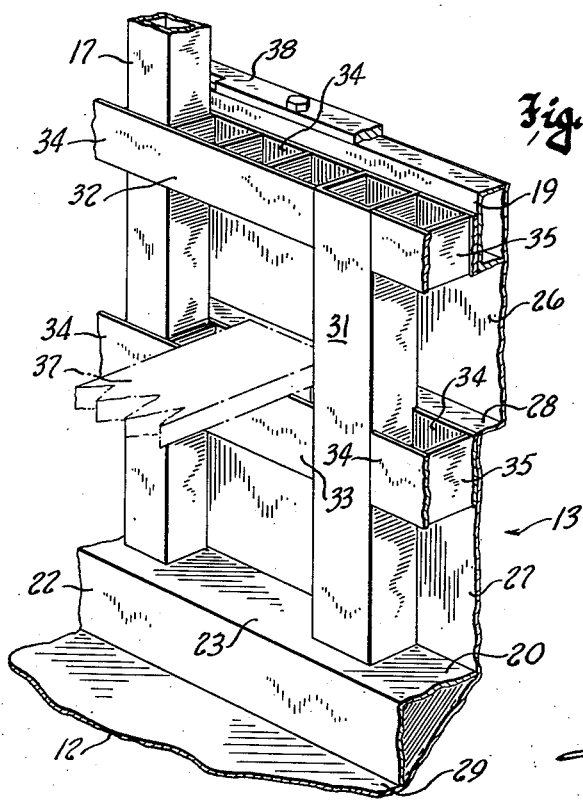
Figure 3 is a fragmentary perspective view of a portion of one side wall of the trailer viewing the same from the inside, and at an enlarged scale.

As indicated best in Figure 2, a superstructure post 17 stepped into any aligning pair of tubular socket sections on either side wall bottoms against and is supported upon the upwardly facing ledge provided by the horizontal leg 23 of the beam 20 therebeneath.

As in the aforesaid patents, the trailer of this invention is also easily converted into a low flat top trailer for hauling freight or oversized automotive vehicles on return trips. For this purpose, a wooden platform or freight supporting deck may be provided by laying planks, generally indicated by the numeral 37 across the trailer at a level substantially corresponding to that of the tops of the chassis sides. In the present case, it is a feature of the invention that the ledges which must be provided to support the platform planks comprise the upper rails 32 having the row of upper tubular socket members therein. For this purpose, the tops of the rails 32 are disposed slightly beneath the level of the tops of the upper beams 19 to which they are affixed so as to enable the platform planks to be laid upon the upper rails and to be confined endwise between the opposing backs of the upper beams.

Retaining bars 38 movably mounted on the tops of the upper beams may be slid over the adjacent ends of the platform planks in the manner described in Patent No. 2,628,264 to lock the platform planks against accidental displacement out of their platform defining positions. It will be understood, of course, that the superstructure may be dismantled before the platform planks are laid down if the freight supporting deck provided thereby is to be entirely unobstructed throughout the entire length and width of the trailer.

Another highly important feature of the trailer of this invention resides in the fact that the lower rails 33 also provide substantially horizontal ledges to support the platform planks 37 at a lower level on the trailer, as indicated in Figure 2. This further increases the versatility of the trailer since it enables either a greater load of freight to be carried on the trailer on return hauls, or assures that bulky loads will be carried safely within the height limitation of 13½ feet for the loaded unit.

From the foregoing description together with the accompanying drawings, it will be readily apparent to those skilled in the art that this invention materially increases the utility of a trailer of the "flat top" type by enabling its superstructure to be erected wherever desired along the length of the trailer; that the beam-like socket forming members which make this feature possible provide additional longitudinal structural members forming a part of the framework of each of the trailer sides to enable them to be constructed of substantially light weight components without loss of strength or rigidity, and, in addition, provide ledges enabling freight supporting planks to be laid thereon at either of two levels when the trailer is not being used for the transportation of automotive vehicles.

What we claim as our invention is:

1. In a transport device of the type having an elongated wheel supported chassis with rigid substantially low upright walls along its sides, the upper edges of said walls being at a level adjacent to that of the tops of said wheels, said chassis having means for supporting one or more automotive vehicles in low level transit positions and having dismountable superstructure means for supporting one or more automotive vehicles in high level transit positions, said superstructure means comprising longitudinally spaced pairs of upright posts each stepped in socket means on the side walls of the chassis with the socket means for each pair of posts transversely opposite one another: characterized by the provision of spaced upper and lower substantially horizontal rail members spaced from but fixed to the inner side of each of said upright walls to reinforce the same; and wherein said socket means is defined by a multiplicity of substantially equispaced upright spacer-like partition members secured to each rail member and extending between it and the adjacent side wall to define a row of tubular socket sections along said rail member, each socket section in an upper row thereof aligning with a socket section in the row therebeneath and being cooperable therewith to endwise slidably receive and support a superstructure post in an upright position on the trailer.

2. In a transport device of the type having an elongated wheel supported chassis with rigid substantially low upright walls along its sides, the upper edges of said walls being at a level adjacent to that of the tops of said wheels, said chassis having means for supporting one or more automotive vehicles in low level transit positions and having superstructure means for supporting one or more automotive vehicles in high level transit positions, said superstructure means comprising longitudinally spaced pairs of upright posts each stepped in socket means on the side walls of the chassis with the socket means for each pair of posts transversely opposite one another: characterized by the provision of spaced upper and lower substantially horizontal hollow beam-like rails fixed to the inner side of each of said upright walls to reinforce and rigidize the same, said beam-like rails being open at their tops and bottoms and having substantially closely spaced upright partitions fixed therein to define vertically aligning socket sections which conjointly provide said socket means.

3. In a transport vehicle of the type having an elongated chassis with substantially low upright sides, and means for supporting one or more automobiles at a low level on said chassis: dismountable superstructure means on the chassis for supporting one or more automobiles at a higher level on the vehicle, said superstructure means comprising longitudinally spaced pairs of upright transversely opposite posts, and socket means on the chassis sides for dismountably supporting said posts at any of a number of closely spaced positions along the chassis sides, comprising spaced upper and lower elongated members extending substantially horizontally along each chassis side, each of said members being spaced from the adjacent chassis side a distance to accommodate one of the upright superstructure posts therebetween, and upright substantially equispaced partition members secured to each of said members and extending between it and the adjacent chassis side to define a row of tubular socket sections extending lengthwise of said member, each socket section in an upper row thereof aligning with a socket section in the row therebeneath, and each pair of aligning socket sections cooperating to provide a holder to embrace portions of a superstructure post spaced lengthwise of said post to thereby rigidly but dismountably support said post in a substantially upright position on the trailer.

4. In a transport device of the type having an elongated wheel supported chassis with rigid substantially low upright side walls the upper edges of which lie at a level adjacent to that of the tops of said wheels, said chassis having means for supporting one or more automotive vehicles in low level transit positions, and having means fixed on each side wall defining a substantially horizontal ledge along substantially the entire length of said side wall near its upper edge, said ledges providing for removably supporting a substantially horizontal platform on the chassis at a level adjacent to that of the tops of said wheels: characterized by the fact that said ledge defining means comprises a rail carried by each side wall and having an elongated portion spaced inwardly thereof; and further characterized by the provision of means on each chassis side wall for removably supporting a post in any of a number of closely spaced upright positions along the length of said side wall, comprising upright substantially equispaced partitions on each of said rails extending outwardly from said elongated portion thereof toward the adjacent side wall of the chassis to provide a row of tubular sockets in any one of which a post may be received.

5. In a transport device of the type having an elongated wheel supported chassis with means thereon for supporting one or more automotive vehicles in low level transit positions, and provided with dismountable superstructure means comprising posts extending upwardly from the chassis sides at locations spaced along the length thereof: characterized by the fact that the chassis is provided with substantially low upright sides, the upper edges of which lie at a level adjacent to that of the tops of said wheels, said sides comprising substantially light weight panelling; and further characterized by the provision of common means for reinforcing the chassis sides and for endwise removably supporting the superstructure posts, said common means comprising elongated substantially horizontal upper and lower reinforcing members secured to each of the chassis sides in spaced relation thereto and extending substantially the entire length thereof, and spacer-like upright partition members extending between each reinforcing member and the adjacent chassis side and fixed thereto to define a multiplicity of tube-like sockets arranged in a row along the length of the reinforcing member, each of the tube-like sockets in an upper reinforcing member aligning vertically with a tube-like socket in the reinforcing member therebeneath and cooperating therewith to slidingly receive spaced portions of a superstructure post to thereby support the post in an upright position on the chassis side.

6. In a transport device of the type having an elongated wheeled chassis: low upright side walls on the chassis each comprising an elongated beam at a level adjacent to that of the tops of said wheels and substantially defining the upper edge of said side wall, an elongated lower beam spaced a substantial distance below said upper beam and defining the bottom portion of said side wall, and a rigid upright member joining said upper and lower beams at each of a plurality of locations spaced from one another along the length of said side wall; elongated upper and lower rails fixed to each side wall and extending lengthwise between adjacent upright members thereon at locations above said lower beam and in vertically spaced relation to one another, the rails on each side wall having partition means thereon defining tubular socket sections equispaced in a row along the length of the rails, and each socket section in an upper rail aligning with a socket section in the rail therebeneath to define a holder to slidably receive and support a post in an upright position on said side wall; and means on the chassis providing a ledge beneath the holders on each side wall, upon which ledges the lower ends of posts in said holders rest.

7. The transport device set forth in claim 6, wherein said lower beams have substantially horizontal upper flanges providing the ledges upon which the lower ends of posts in the holders rest.

8. The transport device set forth in claim 7, wherein said upright members which join the upper and lower beams on each of the chassis side walls is tubular and provides another holder to slidably receive and support a post in an upright position on said side wall.

9. The transport device set forth in claim 8 further characterized by the fact that the lower ends of said upright tubular members seat on and are fixed to said flanges of the lower beams.

10. In a transport device of the type having an elongated wheeled chassis: low upright side walls on the chassis having their upper edges at a level adjacent to that of the tops of said wheels, each side wall comprising a plurality of rigid upright members spaced from one another along the length of said wall, an elongated top beam extending along the upper edge of said side wall and fixed to the outer sides of said upright members, an elongated bottom beam offset inwardly with respect to the top beam and extending along and fixed to the bottoms of said upright members, and an outer light weight metal cover having upper and lower panel sections of substantially equal height, the upper panel section being secured to the outer side of said top beam and extending substantially vertically downwardly therefrom and the lower panel section being offset inwardly from the upper panel section and having its lower portion fixed to said bottom beam and extending substantially vertically upwardly therefrom, and said panel sections being integrally joined together by a substantially narrow horizontally disposed section intermediate the top and bottom edges of said side wall; and elongated upper and lower rails fixed to each side wall and extending lengthwise between the adjacent upright members thereon, the upper rail being fixed to the inner surface of the top beam and the lower rail being fixed to the upper portion of the lower panel section so as to be spaced substantially midway between said top and bottom beams, both of said rails being substantially directly over said bottom beam and each having means thereon defining tubular socket sections equispaced in a row along the length of the rails, each socket section in an upper rail aligning with a socket section in the rail therebeneath to define a holder to slidably receive and support a post in an upright position on the adjacent side wall, with the bottom of the post resting on the top of the bottom beam, said rails providing rigid reinforcing members having their outer sides joined to longitudinally extending elements of the chassis side walls and having their ends fixed to the upright members of the chassis side walls so as to rigidize the same.

11. In a transport device of the type having an elongated wheeled chassis: low upright side walls on the chassis having their upper edges at a level adjacent to that of the tops of said wheels, each side wall comprising a plurality of rigid upright members spaced from one another along the length of said wall, and an outer light weight metal cover fixed to said upright members and having upper and lower panel sections of substantially equal height, the upper panel section extending substantially vertically downwardly from the upper edge of the side wall but being spaced outwardly from said upright members thereon, and the lower panel section being offset inwardly from the upper panel section and extending substantially vertically in contact with said upright members, and said panel sections being joined together by a substantially narrow horizontally disposed section intermediate the top and bottom edges of said side wall; and elongated upper and lower rails on each side wall and extending lengthwise therealong, the upper rail extending along the inner surface of the side wall a short distance beneath the upper edge thereof and the lower rail being fixed directly to the upper portion of the lower panel section so as to be spaced substantially midway between the top and bottom edges of the side wall, said rails being substantially in vertical alignment and each having means thereon defining tubular socket sections equispaced in a row along the length of the rails, each socket section in an upper rail aligning with a socket section in the rail therebeneath to define a holder to slidably receive and support a post in an upright position on the adjacent side wall, said rails providing rigid reinforcing members joined to said upright members and having their outer sides joined to longitudinally extending elements of the chassis side walls so as to rigidize the same.

12. In a transport device: an elongated chassis having low upright rigid side walls and having a bottom portion between the side walls to receive and support a load to be transported at a low level on the device; dismountable superstructure means on the chassis for supporting a load to be transported at a higher level on the device, said superstructure means comprising longitudinally spaced pairs of upright transversely opposite posts carried by the chassis side walls and projecting upwardly therefrom, and load bearing elements carried by said posts at locations spaced a distance above the upper edges of the chassis sides; and socket means on the chassis sides for dismountably supporting said posts at any of a number of closely spaced positions along the chassis sides comprising elongated spaced apart upper and lower rails longitudinally fixed to each side wall and reinforcing the same, each rail having upright partition means thereon defining a row of tubular socket sections along the length of the rail, each socket section in an upper row thereof aligning with a socket section in the row therebeneath, and each pair of aligning socket sections cooperating to provide a holder to receive and rigidly but dismountably support a superstructure post in an upright position on the device.

References Cited in the file of this patent
UNITED STATES PATENTS

| | | |
|---|---|---|
| 1,402,146 | Davis | Jan. 3, 1922 |
| 2,695,810 | Demos | Nov. 30, 1954 |